Dec. 15, 1931.  G. LANGFORD  1,836,032
METHOD OF REFORMING WORN RAIL JOINT BARS
Filed May 11, 1931
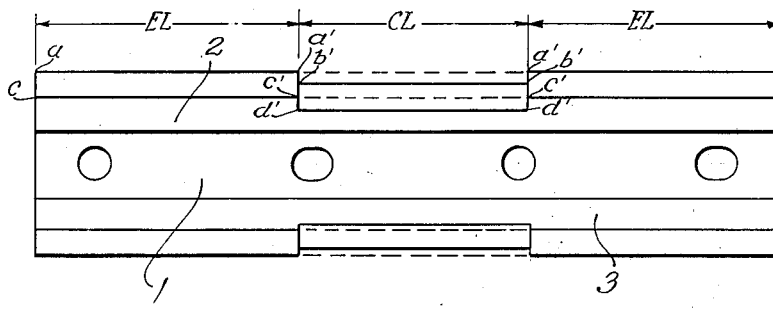
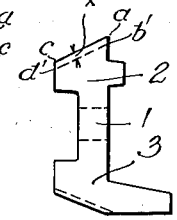
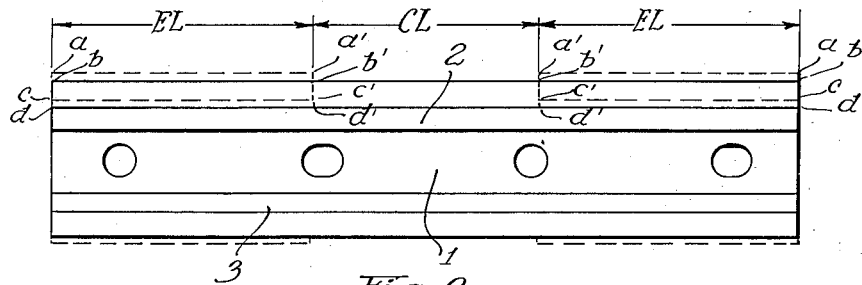
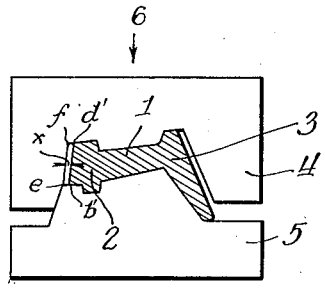
Inventor:
George Langford.
By Brown, Jackson, Boettcher & Dienner.
Attys.

Patented Dec. 15, 1931

1,836,032

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

METHOD OF REFORMING WORN RAIL JOINT BARS

Application filed May 11, 1931. Serial No. 536,375.

The present invention pertains to rail joints used in railway track, and has particular reference to a method of reforming worn rail joint bars so that when their original life is ended they may be reshaped and given another and useful life.

It is well known that in ordinary rail joints, the wear is in most part confined to the center portion of the joints and to the center portion of a bar in the joint. The greatest depth of wear occurs at the middle seven to ten inches or more according to the bar section and severity of service. The end portions of the bar wear very little as compared with the center, and inasmuch as the cross-sections of bars now in use are often intricate, the reforming of a worn bar is something of a problem without some special provision for the disparity of metal on the fishing surfaces at the central portion of the fishing surfaces as compared with the metal on the end portions of the fishing surfaces. Unless this difference between center portion and end portion metal is taken into account in the reforming process, the worn center portion fishing surfaces cannot be restored to their original height and smoothness.

My invention has as its main object a preparation of the worn bar so that the disparity of center portion fishing surface metal is overcome, so that when the bar is subsequently reformed, it may be treated as though it were a bar of substantially uniform cross-section throughout its length, or near enough so for all practical purposes. Another object is to properly reform the worn center portion of the bar without subjecting the comparatively unworn end portions to unnecessary reforming. Still another object is to reform the bar without seriously altering the size or spacing of the bolt holes. These and other objects will become apparent from the following description and from the drawings in which:

Figure 1 is an inside view of a worn bar illustrating graphically the comparative wear between the center portion and end portions of the top and bottom fishing surfaces;

Figure 2 is an end view of the bar of Figure 1;

Figure 3 is an inside view of the bar of Figure 1 after metal has been removed from the top and bottom end portions of the bar; and Figure 4 is an end view of a pair of reforming dies closed upon a bar.

In my copending application, for Method of making bars, filed March 24, 1930, Serial No. 438,276, I disclose a method of reforming a worn bar by graduated pressure applied first to the center portion to first effect the necessary displacement of metal at the most worn central portion of the bar, this pressure then spreading toward the ends, selected surfaces being relieved of pressure toward the ends where least needed. Unless the disparity of center portion metal in the bar is taken into account, the reforming pressure is largely wasted in reforming the end portions which require little reforming, thereby robbing the center portion of much needed pressure.

In my copending application, for Dies for making bars, filed April 10, 1929, Serial No. 354,142, I disclose a pair of reforming dies for practicing the method disclosed in my application, Serial No. 438,276, certain of the die walls being longitudinally convexed and the die cavity corresponding to the worn bar being smaller at its center portion than at its end portions. Such dies are difficult to make, as the die grooves cannot be planed or milled straight through them, various settings of the die being required and much care needed to insure the proper die wall convexities. The present invention is intended to permit the use of a straight-grooved die or pair of dies wherein the die walls are planed straight through, or at least so that the die cavity is not made smaller at its central portion as disclosed in my copending application, Serial No. 354,142. To permit the use of straight-grooved dies, the bar is prepared before reforming, so as to avoid the difficulty resulting from disparity of metal in the badly worn center portion of the bar as compared with the greater amount of metal in the little worn end portions. Removal of metal from the end portions to compensate for lost metal in the center portion results in more equality of metal throughout the length of the worn bar and thereby permits of subsequent reforming by straight-grooved dies or other means to be described.

Figure 1 is an inside view of a worn bar 1 with top member or head 2, and bottom member or base 3. Figure 2 is an end view of the bar of Figure 1. The bar shown is of angle type with head laterally reinforced to give I-beam strength. The comparatively great central wear of the bar at top is of length CL, this wear being shown graphically for purpose of description. Actually the central wear is a concavity merging into the end portions EL which are shown as having no wear. Actually the ends may have some wear but less than at the center portion. The top surface of the bar is indicated by $a$—$a'$—$c'$—$c$ at the end portions of Figure 1, and by $b'$—$b'$—$d'$—$d'$ at the center portion, the latter being worn deeper than the ends by an amount $x$ indicated in Figure 2. Briefly, referring to Figure 2, I remove metal for the width $a$—$c$ and depth $x$ from each end length EL of Figure 1.

Figure 3 shows the bar in full lines after the surplus of metal on each end portion of the top and bottom fishing surface has been removed. I have not thought it necessary to describe the removal of metal from the end portions at the bottom of the bar as this would be mere repetition of how I treat the end portions at the top; furthermore, the bottom fishing surface wears less than the top fishing surface and it may not always be found necessary to remove metal from the bottom.

The removal of end portion surface metal may be accomplished by grinding, by machining, or by any other method that insures the required removal. There have been so many improvements in grinding machinery that at present I would choose grinding as the preferred method. However, I do not limit myself to a grinding method or to any particular method, as long as it removes the end portion metal required.

The bar of Fig. 3 with the end portion metal removed at top and bottom is shown of uniform size throughout. It need not be absolutely so, the intention being to remove enough surplus end portion metal so that the worn center portion may be properly reformed in dies which do not require smaller cross area at center than at the ends. After the worn bar of Figs. 1 and 2 is brought to the condition of Fig. 3, it is then heated and reformed. The heating may precede the removal of end metal, but this removal is more easily done cold than hot, although it may be found practical to remove metal after the bar has been heated. The removal of end metal, particularly from the top of the bar, is essential, however, as that greatly simplifies the apparatus required for reforming. It also simplifies other problems, one of them having to do with the bolt holes in the bar.

The use of graduated pressure and dies with longitudinal convexities previously referred to as disclosed in my copending applications, Serial Nos. 438,276 and 354,142, respectively, permits the reforming of a worn bar without removal of end portion metal, but I find it desirable in bars so reformed to provide means to correct the tendency for the bolt holes to become undersized, distorted, or improperly spaced. The greatest trouble occurs at the two center bolt holes, as there is more shifting of metal at center than at the ends of the bar. Although tolerance of inspection might make the end bolt holes acceptable in the reformed bar, the center bolt holes require some correction. Inasmuch as the prepared bar of Fig. 2 does not require concentration of reforming pressure at center and greater shift of metal there than at the ends, it is possible to avoid distorting the bolt holes at center beyond the point where they would pass inspection.

Another advantage of preparing the bar according to my invention is the reduced die wear when the bar is reformed in dies. The present preferred practice in the art of reforming worn rail joint bars is to do this in dies under a press.

Fig. 4 is an end view of a top die 4 and a bottom die 5 shown closed upon a bar 1. The bottom die 5 may be fastened to the bed of a power press, and the upper die 4 may be attached to a reciprocating cross-head moved downward in the direction of the arrow 6. This and the position of the bar 3 is but one of various arrangements. The top die may be fixed, and the bottom die made movable, and the bar may be reversed or set at a different angle.

The sectioned area of Fig. 4 represents the worn central portion of the bar. It will be noticed that the top $b'$—$d'$ of the bar does not coincide with the side wall $e$—$f$ of the die, there being space $x$ between the two. This is not actually true when the dies are fully closed, and is drawn so merely to facilitate explanation. More exactly this space is present only when the dies are nearing closure. As the fishing height of the bar is to be raised, the bar fits the top die loosely on top die approach, and as the dies close, the metal of the bar is spread by pressure to the die walls corresponding to the top and bottom fishing surfaces of the bar. This means that the bar surface $b'$—$d'$ is pushed laterally to the die surface $e$—$f$ and does not cause rapid wear of that surface, for there is no grinding or abrasive action as would occur if the bar head were wider than the die groove for it, causing bar surface $b'$—$d'$ to bear hard on die surface $e$—$f$ as the head of the bar was forced into the die groove preparatory to die closure. This absence of abrasive action on the die fishing surface wall is due to the lack of metal on the center portion fishing surface of the worn bar, the latter fitting the die loosely on die approach, and not fitting the die closely until the spreading pressure is completed and the dies are closed. From a practical standpoint, this sort of action has great value, as no other action would result in so little wear and distortion of the die wall fishing surfaces at their central portions. This means long life to the center portion of the dies, the heights and accuracy of the fishing surfaces being maintained at their center portions where accuracy is most needed.

In reforming worn bars in dies in accordance with present practice, the end portions of the bar, being less worn than the center portion, exert a grinding action on the die fishing surfaces and cause more wear there than at the center, seeing that the top fishing surface of the bar end is at $e$—$f$ instead of $b'$—$d'$, as at the center portion, and abrades the corresponding die surface. As a result, I find in practice that in reforming bars in dies in accordance with present practice there is a tendency for the reformed bar to become of too great fishing height at the end portions, as the die surfaces wear there, and frequently the dies must be taken out and dressed, not because of central fishing wear but because of end fishing wear. Preparing the bar as in Fig. 3 removes the surplus end portion metal so that the bar does not grind on the dies at the end portions, thereby overcoming the difficulty above referred to encountered in present practice. The base of the bar and its action on the dies is the same as at the head of the bar, so it is not thought necessary to describe it.

The removal of metal from the end portions of the worn bar prior to reforming also eliminates unnecessary reforming pressure. It does not take great pressure to flow hot metal in a die, but when the die cavity is once filled it sets up resistance very rapidly and the pressure becomes enormous because the metal has no place to go. The removal of metal from the end portions of the worn bar relieves end resistance and enables a better concentration of pressure upon the worn center portion of the bar where reforming pressure is most needed.

Inasmuch as hot metal flows readily in a die under pressure it is not absolutely necessary to remove the surplus metal of the bar's end portions from the fishing surfaces. Metal to be removed from the head may be taken from the inside of the head, from the outside, or from underneath on the inside or the outside, for various purposes, the main purpose being to remove the surplus metal to facilitate reforming. Metal may also be removed from various surfaces of the base at its end portions.

A worn bar so prepared that its end portion metal more nearly balances the center portion metal, simplifies the reforming operation. The die grooves may be made straight so that the reforming action is comparatively uniform throughout the length of the bar.

With the use of care and precision in removal of metal from the end portions, particularly from a fishing surface, the bar might be subsequently reformed cold by forging, pressing or rolling, procedures now commonly practiced in various forms of metal working. This would obviate the necessity for heating the bar, or the heating temperature might be much less than is now employed. The fact that a slightly loose fishing fit of the end portions of a bar to the rail has the advantage of a tight fit of the center portion of the joint, would then encourage removal of more rather than less metal from the end portions of the bar prior to reforming, hot or cold. Other means and methods of reforming may be employed, and so I do not wish to be limited to any particular means or method, the essential feature of my invention being that before reforming, the worn bar must have metal removed in any suitable manner from its end portions to compensate in more or less degree for the metal lost by wear at the center portion.

The removal of metal from the end portions of a worn bar to give the bar more uniformity in amount of metal throughout its length may sound simple but this does not detract from the novelty of procedure as a step in a reforming process which subsequently greatly simplifies the actual reforming under pressure. This I believe to be broadly new.

In the performance of my invention I remove metal from the top of the bar at least, and the metal removed from the end portions is in sufficient amount, as regards length and depth, to relieve the excessive end pressure that would otherwise occur in the reforming operation, were the end portions of the bar not relieved of surplus metal.

In the making of crowned bars with fishing height greater at the center portion than at the ends, more metal may be ground or removed from the end portions than would be necessary for the making of uncrowned bars. If ordinary dies are employed to make crowned bars, the die wall opposing the fishing surface wall which is concaved to make the crown could then have a convexity of the same curvature as the die fishing surface concavity, although I do not limit myself to such a form of die construction, nor even to dies, since my invention renders practicable the reforming of worn bars by forging, rolling, and combined rolling and pressing operations known in the art.

As will be clear from the above, my invention is directed particularly to preparation of a worn bar, preliminary to reforming thereof, in such manner that the prepared bar is of substantially uniform cross-sectional area and can be accurately reformed in straight grooved dies, or by other suitable means known in the art. Preferably, this is done by removal of metal at the end portions of the worn bar, as above described, which is a highly efficient and extremely simple way of accomplishing the desired result. It is possible, however, to accomplish this result in other ways, such as, for example, by filling in the central worn portion of the bar by welding in metal, or otherwise. In its broader aspects, therefore, my invention comprehends the preparation of a worn bar for reforming, by rendering such bar of substantially uniform cross-sectional area, preliminary to the reforming operation, whether this be accomplished by removal of metal at the end portions of the bar or in any other suitable manner.

What I claim is:

1. A method of reforming a worn rail joint bar, consisting in removing metal from the top member of the bar for a substantial length of each end portion, then heating the bar and subjecting said top member to reforming pressure.

2. A method of reforming a worn rail joint bar, consisting in removing metal from the bottom member of the bar for a substantial length of each end portion, then heating the bar and subjecting said bottom member to reforming pressure.

3. A method of reforming a fishing surface of a worn rail joint bar, consisting in removing metal from said surface for a substantial length of each end portion, then heating the bar and subjecting said surface to reforming pressure.

4. A method of reforming a worn rail joint bar, consisting in removing metal from one of the top and bottom members of the bar for a substantial length of each end portion, then heating the bar and subjecting it to reforming pressure.

5. A method of reforming a worn rail joint bar, consisting in heating the bar, then removing metal from one of the top and bottom members of the bar for a substantial length of each end portion, and then subjecting the bar to reforming pressure.

6. A method of reforming one of the top and bottom members of a worn rail joint bar, said member having its fishing surface worn more at the center portion than at the end portions, consisting in removing metal of substantial length from the fishing surface at its end portions, then heating the bar and subjecting said member to reforming pressure.

7. A method of reforming one of the top and bottom fishing surfaces of a worn rail joint bar, said member having its fishing surface worn more at the center portion than at the end portions, consisting in removing metal from a surface of said member other than said fishing surface and for a substantial length at the end portions of said other surface, then heating the bar and subjecting said member to reforming pressure.

8. A method of reforming a worn rail joint bar worn more at its central portion than at its end portions, consisting in removing metal from at least one of the surfaces of at least one of the top and bottom members of the bar, said metal being removed from the end portions of the bar and in amount of depth and length for appreciable reduction of end portion metal to attain approximate uniformity in amount of metal at the center portion and end portions of the bar, then heating the bar and subjecting it to reforming pressure.

9. A method of reforming a worn rail joint bar, consisting in removing metal from at least one of the surfaces of at least one of the top and bottom members of the bar, said metal being removed from the end portions of the bar and in amount of depth and length for appreciable reduction of end portion metal to less per unit of length than center portion metal, then heating the bar and subjecting it to reforming pressure.

10. A method of reforming one of the top and bottom members of a worn bar, consisting in removing metal of substantial length and depth from the end portions of said member, and then subjecting it to reforming pressure.

11. The method of reforming a worn rail joint bar, certain portions of which are worn to a greater extent than other portions of the bar, which consists in removing metal from the less worn portions and thereby rendering the bar of substantially uniform cross-sectional area, and then subjecting the bar to reforming pressure in contact with forming surfaces and thereby accurately forming the bar as to fishing surfaces and height.

12. The method of reforming a worn rail joint bar, certain portions of which are worn to a greater extent than other portions of the bar, which consists in rendering the bar of substantially uniform cross-sectional area, and then subjecting the bar to reforming pressure in contact with forming surfaces and thereby accurately forming the bar as to fishing surfaces and height.

In witness whereof, I hereunto subscribe my name this 7th day of May, 1931.

GEORGE LANGFORD.